United States Patent
White

(10) Patent No.: US 8,315,187 B1
(45) Date of Patent: Nov. 20, 2012

(54) DYNAMIC HEAD OF LINE ALLOCATION

(75) Inventor: Martin White, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 439 days.

(21) Appl. No.: 12/544,648

(22) Filed: Aug. 20, 2009

Related U.S. Application Data

(60) Provisional application No. 61/093,599, filed on Sep. 2, 2008.

(51) Int. Cl.
*H04L 12/28* (2006.01)
(52) U.S. Cl. .................................... 370/254; 370/419
(58) Field of Classification Search .................. 370/254, 370/419
See application file for complete search history.

(56) References Cited

U.S. PATENT DOCUMENTS

| | | | |
|---|---|---|---|
| 7,631,096 B1 * | 12/2009 | Yeh et al. | 709/235 |
| 2002/0097675 A1 * | 7/2002 | Fowler et al. | 370/230 |
| 2005/0195845 A1 * | 9/2005 | Mayhew et al. | 370/412 |
| 2006/0050690 A1 * | 3/2006 | Epps et al. | 370/359 |
| 2008/0056278 A1 * | 3/2008 | Kadambi et al. | 370/395.53 |
| 2008/0219269 A1 * | 9/2008 | Minkenberg et al. | 370/395.4 |

* cited by examiner

*Primary Examiner* — Robert Wilson
*Assistant Examiner* — Wei Zhao

(57) ABSTRACT

A dynamic HOL allocation module that supports, dynamically configurable classes of service, virtual output queues that support dynamically configurable HOL blocking factors, and dynamically configurable queue assignment schemes, is described. A user may define classes of service assigned to a source port within a network switch and may configure each class of service with a set of virtual output queues, or queue set. Each queue set may be configured to include a user configured number of virtual output queues based on an HOL blocking factor, e.g., 1:1, 1:24, etc., selected by the user for the class of service. Further, the assignment scheme used to assign packets received on a source port to a class of service and the assignment scheme used to assign packets assigned to a class of service to a virtual output queue may be dynamically configurable based on day, day/time, traffic load, alarm events and/or other factors.

20 Claims, 7 Drawing Sheets

DYNAMIC HEAD OF LINE ALLOCATION

INCORPORATION BY REFERENCE

This application claims the benefit of U.S. Provisional Application No. 61/093,599, "DYNAMIC HOL ALLOCATION," filed by Martin White on Sep. 2, 2008, which is incorporated herein by reference in its entirety.

BACKGROUND

A network switch receives data packets on a first set of ports, or source ports, and transmits the received data packets from a second set of ports, or destination ports, based on destination information included in each packet. Each network switch temporarily stores packets of data received on its respective source ports until the switch can determine a destination port that the packet should be directed to and until the determined destination port is ready to transmit the packet via an external media, e.g., a network cable, an optical fiber cable, a radio frequency, etc.

Class of Service (CoS) management manages traffic in a network by grouping similar types of traffic (for example, e-mail, streaming video, voice, large document file transfer) together and treating each type of traffic as a class with its own level of service priority. Class of service technologies do not guarantee a level of service in terms of bandwidth and delivery time, rather, class of service technologies merely assure that traffic assigned a higher class of service is provided priority treatment, over traffic assigned a lower class of service, with respect to the allocation of shared resources required to transmit the higher class of service traffic to its intended destination.

A network switch may support multiple classes of service for traffic received on each source port and may be capable of delivering data received on a network switch source port to any one of the network switch destination ports. To accomplish these tasks and to avoid traffic congestion within the network switch due to head of line (HOL) blocking, described below, a network switch may maintain a set of virtual output queues, or queue set, for each class of service supported by each network switch source port. Each queue set may include a virtual output queue for each destination port supported by the network switch. For example, assuming a one-to-one, or linear, mapping of class of service virtual output queues to destination ports, a network switch with 48 destination ports and 36 source ports, each source port supporting 4 classes of service, would be required to maintain 48×36×4=6912 virtual output queues.

Head of Line (HOL) blocking can occur in network switches that do not provide a linear mapping of class of service virtual output queues to destination ports. The ratio of destination ports to the number of source port virtual queues provided for a class of service supported by a source port may be referred to as the HOL blocking factor for that source port class of service. For example, assuming that a network switch includes 48 destination ports and each source port has 48 virtual output queues assigned to a class of service supported by the source port, the HOL blocking factor for that source port class of service is 1.0. However, assuming that a network switch includes 48 destination ports and each source port has 36 virtual output queues assigned to a class of service supported by the source port, the HOL blocking factor for that source port class of service is 1.5. The greater the HOL blocking factor, the greater the likelihood that HOL blocking may occur.

For example, a network source port class of service that has an HOL blocking factor greater than 1 may experience HOL blocking during periods of heavy network traffic. For example, during periods of heavy network traffic, all the virtual output queues in a queue set that supports a source port class of service may be assigned a packet. Therefore, queues that have already been assigned a first packet may be assigned subsequent packets that are destined for various destination ports. If a packet at the head of the queue is destined for a destination port that is unable to remove a packet from the queue in a timely manner, e.g., due to down-stream network congestion, the other packets in the queue, e.g., destined for destination ports that are not affected by down-stream network congestion, will remain trapped in the queue blocked by the packet at the head of the line in the queue, hence the name, head of line (HOL) blocking.

SUMMARY

As the number of source ports and destination ports included in network switches increases, the physical queue memory, physical buffers, address/data lines, related processing capabilities, and increased clock timing requirements, needed to support a linear mapping of source port class of service virtual output queues to destination ports, begins to impact the size, complexity, cost and performance of the network switch. Unfortunately, network switch designs that incorporate an HOL blocking factor that is too conservative for the environment in which the network switch is used include physical support for virtual output queues that are only used, if ever, during periods of heavy traffic. Network switch designs that incorporate an HOL blocking factor that is too aggressive for the environment in which the network switch is used suffer from HOL blocking during periods of heavy traffic. Therefore, a need exists for a network switch in which the HOL blocking factors applied to the respective source port classes of service may be configured and/or dynamically adapted to optimize the physical resources of the network switch to best meet the operational traffic in the environment in which the network switch will be used.

A dynamic Head of Line (HOL) allocation module is described that supports, dynamically configurable classes of service, dynamically configurable virtual output queues that support dynamically configurable HOL blocking factors, and dynamically configurable queue assignment schemes, based on default or user configured parameters. The described dynamic HOL allocation module allows a mix of linear virtual output queue to destination port mappings and HOL ratio based virtual output queue to destination port mappings to be used to manage traffic of different classes of service received on the same network switch source port. Example embodiments of the described dynamic HOL allocation module may allow a user to define classes of service that may be assigned to a source port within the network switch and to configure each class of service with a set of virtual output queues, or queue set. The HOL blocking factor for each source port class of service, i.e., the ratio of destination ports supported to the number of virtual output queues assigned to a source port class of service, e.g., 1:1, 1.5:1, 2:1, 4:1, 8:1, 24:1, etc., may be configured by the user for each class of service supported by the switch. Further, the class of service assignment scheme used to assign packets received on a source port to a class of service may be dynamically configurable based on day, day/time, traffic load, alarm events and/or other factors to allow the dynamic HOL allocation module to efficiently accommodate the changing traffic loads and requirements in the environment in which the network switch is used.

In addition, to mitigate the adverse effects of HOL blocking in source port class of service queue sets with an HOL blocking factor greater that 1.0, the described dynamic HOL allocation module may include several queue set assignment schemes that may be used, as needed, to efficiently assign and evenly distribute packets belonging to the same class of service across the virtual output queues within a queue set. In this manner, the described dynamic HOL allocation module assures that the adverse impact of any HOL blocking encountered by a source port class of service queue set does not disproportionately impact any single data stream passing through the queue set.

For example, under light traffic conditions, the dynamic HOL allocation module may monitor the status of the virtual output queues in a queue set, e.g., with a counter assigned to each queue, and may assign a newly received packet to a queue that is known to be empty, thus minimizing the possibility that HOL blocking may occur under light traffic conditions. As traffic increases and queues within the queue set are required to accept multiple packets, the dynamic HOL allocation module may assign newly received packets to individual queues within a queue set using, for example, a sequential order based assignment scheme, a round-robin based assignment scheme and/or a random sequence based assignment scheme to reduce the long term impact of HOL blocking on any single queue. Such queue set allocation techniques used by the dynamic HOL allocation module may be tailored to meet the needs of the operational environment in which the network switch is used based on a set of user preferences and/or a set of default configuration parameters.

To maximize the flexibility of dynamic HOL allocation module queue set configurations, a user may elect to configure the dynamic HOL allocation module to treat one or more types of traffic as a single class of service and/or to treat a single type of traffic as multiple classes of services based on one or more criteria such as one or more of a CoS field data content contained in a header of a received packet, a destination field content contained in a header of the received packet, a size of the received packet, a time of day that the packet was received, a traffic load on the switch at the time the packet was received, a traffic load on the network switch at the time the packet was received, an alarm condition at the time the packet was received and/or other consideration, such as the port on which the packet was received.

By supporting dynamically configurable virtual output queues that support dynamically configurable HOL blocking factors and that use a dynamically configurable set of queue assignment schemes, the described dynamic Head of Line (HOL) allocation module is able to support a dynamically configurable set of classes of service while minimizing HOL blocking and minimizing physical resource requirements. A network switch that includes the described dynamic Head of Line (HOL) allocation module may be configured by a user to meet the traffic loads of the operational environment in which the network switch will be used, thereby providing greater functional switching capability without increasing the physical resources provided within the network switch, and hence, the complexity and cost of the network switch. Alternatively, a network switch that includes the described dynamic Head of Line (HOL) allocation module may be designed with fewer physical resources, hence reducing the complexity and cost of the network switch, while maintaining the same functional capability of a switch provided with a greater number of physical resources at a greater cost.

In one example embodiment, a class of service (CoS) head of line (HOL) allocation module is described that may include, a plurality of CoS mapping modules, each CoS mapping module of the plurality of CoS mapping modules configured to receive packets from a unique network switch source port and to assign one of a plurality of classes of service to each received packet, a plurality of queue sets, each queue set of the plurality of queue sets configured with a plurality of assigned queues, the assigned queues in each of the plurality of queue sets configured to receive from a common one of the plurality of CoS mapping modules packets assigned to a common one of the plurality of classes of service, a plurality of queue mapping modules, each of the plurality of queue mapping modules configured to receive from a common one of the plurality of CoS mapping modules packets assigned to a common one of the plurality of classes of service and to assign each received packet to one of the plurality of assigned queues in a common one of the plurality of queue sets, wherein a number of assigned queues in each of the plurality of queue sets that receives packets from a common one of the plurality of CoS mapping modules is based on one of an HOL blocking factor equal to 1 and an HOL blocking factor greater than 1.

In a second example embodiment, a method of configuring a class of service (CoS) head of line (HOL) allocation module for use in a network switch is described that may include, configuring a plurality of CoS mapping modules to receive packets from a unique source port in the network switch and to assign one of a plurality of classes of service to each received packet, configuring each queue set in a plurality of queue sets to include a plurality of assigned queues, configuring the assigned queues in each of the plurality of queue sets to receive, from a common one of the plurality of CoS mapping modules, packets assigned to a common one of the plurality of classes of service, configuring each queue mapping module in a plurality of queue mapping modules to receive packets assigned to a common one of the plurality of classes of service from a common one of the plurality of CoS mapping modules and to assign each received packet to one of the plurality of assigned queues in a common one of the plurality of queue sets, wherein a number of assigned queues to each of the plurality of queue sets that receives packets from a common one of the plurality of CoS mapping modules is based on one of an HOL blocking factor equal to 1 and an HOL blocking factor greater than 1.

In a third example embodiment, a network switch described, that may include, a plurality of source ports that receive packets over a first transmission media, a class of service (CoS) head of line (HOL) allocation module, that may include, a plurality of CoS mapping modules, each CoS mapping module of the plurality of CoS mapping modules configured to receive packets from a unique network switch source port and to assign one of a plurality of classes of service to each received packet, a plurality of queue sets, each queue set of the plurality of queue sets configured with a plurality of assigned queues, the assigned queues in each of the plurality of queue sets configured to receive from a common one of the plurality of CoS mapping modules packets assigned to a common one of the plurality of classes of service, a plurality of queue mapping modules, each of the plurality of queue mapping modules configured to receive from a common one of the plurality of CoS mapping modules packets assigned to a common one of the plurality of classes of service and to assign each received packet to one of the plurality of assigned queues in a common one of the plurality of queue sets, wherein a number of assigned queues in each of the plurality of queue sets that receives packets from a common one of the plurality of CoS mapping modules is based on one of an HOL blocking factor equal to 1 and an HOL blocking factor greater than 1, a switch fabric that removes packets from the respective plurality of queues assigned to the respective queue sets and delivers the respective packets to a destination port buffer, and a plurality of destination ports, each destination port associated with a respective destination port buffer, that transmits packets retrieved from the respective destination port buffer over a second transmission media.

BRIEF DESCRIPTION OF THE DRAWINGS

Example embodiments of a dynamic HOL allocation module that supports, dynamically configurable classes of service, dynamically configurable virtual output queues that support dynamically configurable HOL blocking factors, and dynamically configurable queue assignment schemes, based on a set of default parameters and/or user configured parameters and/or network traffic conditions and/or alarm events will be described with reference to the following drawings, wherein like numerals designate like elements, and wherein.

DETAILED DESCRIPTION OF EMBODIMENTS

Figure 1:
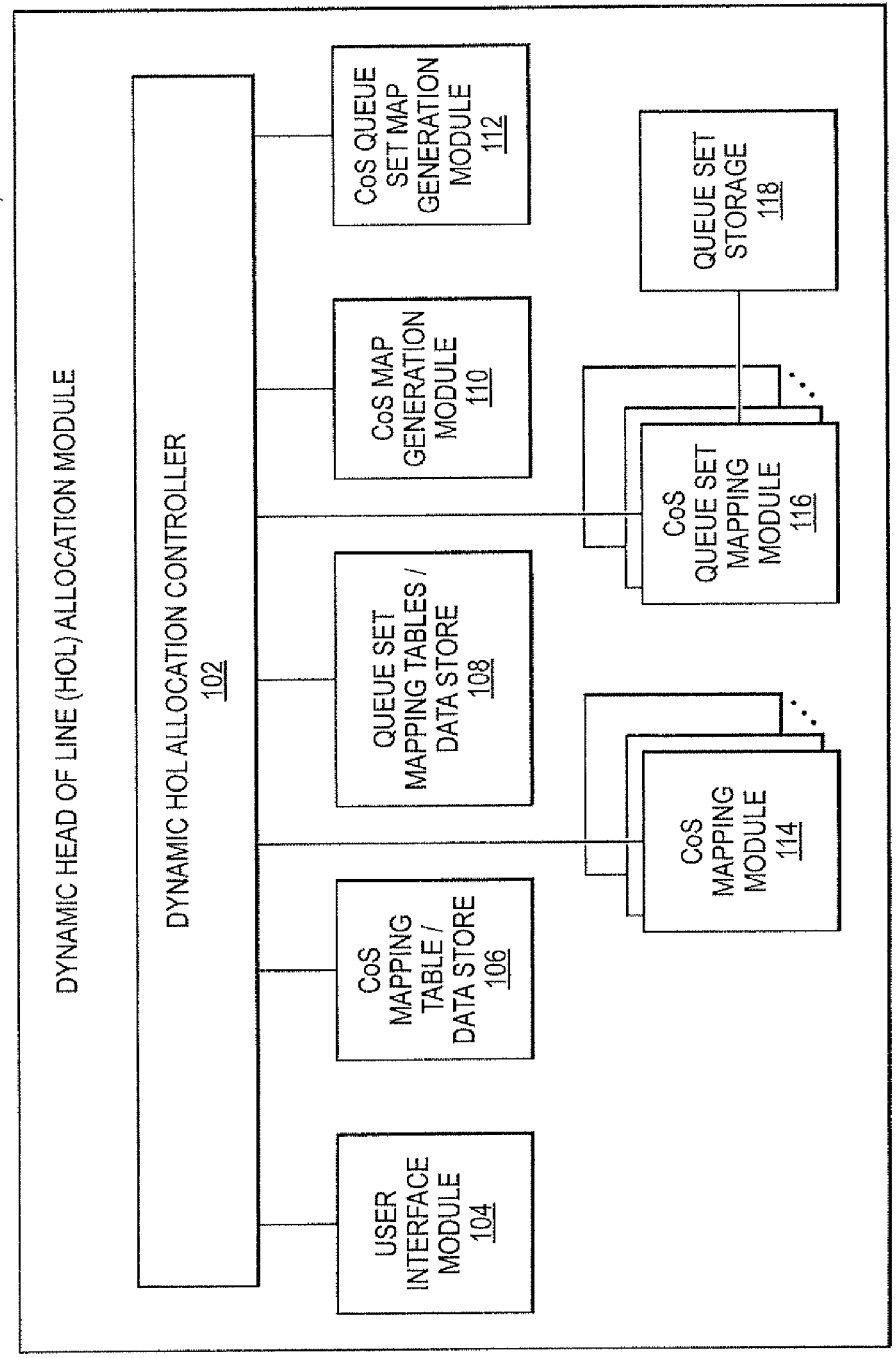
FIG. 1 is a block diagram of an example dynamic HOL allocation module.

FIG. 1 is a block diagram of an example embodiment of a dynamic head of line (HOL) allocation module 100 that supports dynamically configurable classes of service, dynamically configurable virtual output queues that support dynamically configurable HOL blocking factors, and dynamically configurable queue assignment schemes, based on user configured and/or default parameters. Example embodiments of the described dynamic HOL allocation module 100 may allow a user to define classes of service that may be assigned to a source port within the network switch and to configure each class of service with a set of virtual output queues, or queue set. Each queue set may be configured to include a user configured number of virtual output queues based on an HOL blocking factor, e.g., 1:1, 2:1, 4:1, 8:1, 24:1, etc., selected by the user for the class of service. Further, an assignment scheme used to assign packets received on a source port to a class of service, and an assignment scheme used to assign packets assigned to a class of service to a virtual output queue within a queue set, may be user configurable. Such assignment schemes may be dynamically configurable based on day, day/time, traffic load, alarm events and/or other factors to allow the allocation module to efficiently accommodate changing traffic loads and requirements in the environment in which the network switch is used. As shown in FIG. 1, an example embodiment of a dynamic HOL allocation module 100 may include a dynamic HOL allocation controller 102, a user interface module 104, a CoS mapping table/data store 106, a queue set mapping tables/data store 108, a CoS map generation module 110, a CoS queue set map generation module 112, one or more CoS mapping modules (CMM) 114, one or more CoS queue set mapping modules (CQMM) 116 and a queue set storage 118.

In operation, dynamic HOL allocation controller 102 may maintain a workflow state machine, and/or control parameters that allow controller 102 to initiate, monitor and/or control each of the respective units described below to perform tasks that support a common process flow, such as process flows describe below with respect to FIG. 4 through FIG. 7.

User interface module 104 may provide a user interface that allows a user to configure dynamic HOL allocation module 100 with control parameters that define one or more classes of service for use by dynamic HOL allocation module 100, that define a number of virtual output queues, i.e., the HOL blocking factor, assigned to a queue set assigned to each defined source port class of service. User interface module 104 may also allow a user to define one or more queue assignment schemes that are used to assign packets to the respective virtual output queues within the respective source port class of service queue sets. These configuration parameters may be used to configure a predetermined set of physical resources, e.g., memory space, table space, physical queues, etc., included within dynamic HOL allocation module 100, to meet the traffic load and/or other requirements of the environment in which the network switch that includes the dynamic HOL allocation controller will be used. These configuration parameters may also be used to control operation of the allocated physical resources based on a user specified, or default, fixed configuration or based on a user specified, or default, configuration that is dynamically selected in response to traffic loads, time-of-day traffic, alarm events, etc., as described below.

CoS mapping table/data store 106 may be used to store definition, control parameters and mapping tables that may be used to define classes of service available on source ports of a network switch that includes dynamic HOL allocation module 100, and may store mappings and control parameters that control operations performed by dynamic HOL allocation module 100 based on a class of service determined for a received packet. For example, CoS mapping table/data store 106 may be used to define classes of service associated with each network switch source port. CoS mapping table/data store 106 may be used to store assignment criteria for use by the CoS mapping module (CMM) 114, described below, to map a received packet to the CoS queue set mapping module (CQMM) 116, described below, based on one or more criteria. Such criteria may include, but is not limited to, one or more of a CoS field data content contained in a header of a received packet, a destination field content contained in a header of the received packet, a size of the received packet, a time of day that the packet was received, a traffic load on the network switch at the time the packet was received, an alarm condition at the time the packet was received and/or other considerations, such as the source port on which the packet was received.

Queue set mapping tables/data store 108 may be used to store control parameters, queue set queue assignments, and queue assignment schemes that may be used to generate and control the operation of the CoS queue set mapping module (CQMM) 116 and its associated queue set, both described below. For example, CoS queue set mapping tables/data store 108 may store an HOL blocking factor that may be used by CoS queue set map generation module 112, described below, to allocate queues from queue set storage 118 to the CoS queue set mapping module (CQMM) 116 that manages a class of service for a source port. Further, CoS queue set mapping tables/data store 118 may store queue set assignment scheme data, e.g., queue assignment algorithms, that may be used by CoS queue set map generation module 112 to generate queue assignment lists, e.g., one or more of a sequential order list, a round-robin sequence list, and a random order list, etc., for a specific queue set that has been selected and assigned by CoS queue set map generation module 112 to a specific CoS queue set mapping module (CQMM) 116, as described in greater detail below.

CoS map generation module 110 may allocate and configure the CoS mapping module (CMM) 114, described in greater detail below, for each physical network switch port and may configure the CoS mapping module (CMM) 114 with a CoS mapping table that the CoS mapping module (CMM) 114 may use to assign packets received on a source port to the CoS queue set mapping module (CQMM) 116, also described in greater detail below, that assigns the received packet to a queue within a queue set assigned to a source port class of service.

CoS queue set map generation module 112 may allocate and configure a plurality of CoS queue set mapping modules (CQMM) 116, for each defined CoS mapping module (CMM) 114 generated by CoS map generation module 110. Further, CoS queue set map generation module 112 may allocate a set of virtual output queues, or queue set, from queue storage 118 for each CoS queue set mapping module (CQMM) 116 and may build one or more queue assignment lists that may be used by each CoS queue set mapping module (CQMM) 116 to assign packets received from its associated CoS mapping module (CMM) 114 to a queue within its associated queue set. For example, the number of queues included in a source port class of service queue set may be based on the HOL blocking factor assigned by a user to a corresponding class of service via user interface module 104. The control parameters that define the respective CoS queue set mapping module queue sets, and the queue assignment lists implemented by the respective CoS queue set mapping modules (CQMM) 116 may be stored in queue set mapping tables/data store 108.

A CoS mapping module (CMM) 114 may be configured for each physical source port included within a network switch that includes dynamic HOL allocation module 100. Each CoS mapping module (CMM) 114 may be configured by CoS map generation module 110 based on user configured parameters received from a user via user interface module 104 and stored in CoS mapping table/data store 106, as described above. In operation, each CoS mapping module (CMM) 114 may receive packets from a single physical port and may assign a received packet to one of several CoS queue set mapping modules (CQMM) 116 based on a class of service determined for the packet and assignment data stored in CoS mapping table/data store 106. The CoS queue set mapping module (CQMM) 116 to which a received packet is assigned may be determined in one of several ways, based on user configured control parameters, and/or default parameter, included in CoS mapping table/data store 106.

In one example embodiment, a CoS mapping module (CMM) 114 may be configured, based on user specified parameters, to parse the header of an incoming data packet for a class of service code in the packet header and to route the packet to a corresponding CoS queue set mapping module (CQMM) 116 based on the header CoS data. In another example embodiment, a CoS mapping module (CMM) 114 may be configured, based on user specified parameters, to parse the header of an incoming data packet for a class of service code in the packet header and to combine one or more designated CoS header assignments so that multiple classes of service packets are consolidated to a smaller number of classes of service supported by dynamic HOL allocation module 100. In yet another example embodiment, a CoS mapping module (CMM) 114 may be configured, based on user specified parameters, to parse the header of an incoming data packet for a class of service and/or other data such as a size of the packet and/or a destination of the packet and may assign the packet to a CoS queue set mapping module 116 based on combinations of the retrieved packet header data. In addition, CoS mapping table/data store 106 may include multiple assignment criteria that may be dynamically selected for use by CoS mapping module (CMM) 114 based on one or more of time of day, traffic load, alarm events and/or other notifications received from Dynamic HOL allocation controller 102.

A CoS queue set mapping module (CQMM) 116 may be generated for each class of service associated with a network switch physical source port included within a network switch that includes dynamic HOL allocation module 100. Each CoS queue set mapping module (CQMM) 116, and associated queue set, may be configured by CoS queue set map generation module 112 based on user configured parameters received from a user via user interface module 104 and/or default parameters stored in queue set mapping tables/data store 108, as described above. For example, the number of queues included in a queue set may be based on an HOL blocking factor assigned by the user to each class of service supported by the network switch via user interface module 104. The control parameters that define the respective CoS queue set mapping module (CQMM) 116 queue sets, and the assignment schemes implemented by the respective CoS queue set mapping modules (CQMM) 116 may also be stored in queue set mapping tables/data store 108. In operation, each CoS queue set mapping module (CQMM) 116 may receive packets from a CoS mapping module (CMM) 114 and may assign each packet to a queue within its queue set based on a queue assignment list retrieved from queue set mapping tables/data store 108. In one example embodiment, the selection of a queue assignment list from a plurality of available queue assignment lists stored in queue set mapping tables/data store 108 may be based on one or more selection criteria such as day, day/time, traffic load, alarm events and/or other factors to allow dynamic HOL allocation module 100 to select a queue assignment scheme that efficiently accommodates the current state of a queue set based on current traffic loads and/or other considerations.

In one example embodiment, a CoS queue set mapping module (CQMM) 116 may be configured with a queue set that provides a 1:1 ratio between virtual output queues included in the queue set and destination ports supported by the network switch. In such an embodiment CoS queue set mapping module (CQMM) 116 may be configured to assign a packet to a queue in the queue set that is associated with the destination port of the packet. In another example embodiment, a CoS queue set mapping module (CQMM) 116 may be configured with a queue set based on a user selected HOL blocking factor, e.g., 2:1, 4:1, 6:1, 8:1, 24:1, that determines the number of virtual output queues included in the queue set based on the number of destination ports supported by the network switch and the user selected HOL blocking factor. The user selected HOL blocking factor in such an embodiment specifies a desired ratio between the number of destination ports supported by the network switch and the number of virtual output queues to be included in the queue set. Further, in such an embodiment, CoS queue set mapping module (CQMM) 116 may be configured to assign a packet to a queue based on a hierarchical selection process. For example, if CoS queue set mapping module (CQMM) 116 is able to locate an empty queue within the queue set, the first choice assignment may be to assign the packet to the located empty queue. Otherwise, CoS queue set mapping module (CQMM) 116 may assign the packet to a queue based on one or more queue assignment lists. For example, CoS queue set mapping module (CQMM) 116 may use one of a sequential order queue assignment list in which each queue is selected in the sequential order in which the queue was added to a queue set before the list is repeated, a round-robin queue assignment list in which a queue is selected based on a round robin list that assures that each queue in the queue set is selected before the list is repeated, or a pseudo-random queue assignment list in which a queue is selected based on a random ordered list of queues, or a queue content based process in which a queue is selected that already contain packets destined for the same destination port as the current packet.

Queue set storage 118 may include physical queue storage space that may be allocated by CoS queue set map generation module 112 to a queue set assigned to a CoS queue set mapping module (CQMM) 116, based on user provided, or default, control parameters, as described above. For example, assuming that a network switch was designed to support a linear mapping of virtual output queues to destination ports, i.e., a zero HOL blocking factor design, the network switch has 48 destination ports and 36 source ports, and each source port supports 4 classes of service to the respective destination ports, queue set storage 118 would need to physically accommodate 48×36×4=6,912 virtual output queues. However, as described above, dynamic HOL allocation module 100 allows a user to selectively configure a queue set supporting a source port class of service with a user selected blocking factor. Therefore, assuming in the example above that the respective classes of service were configured to support 1:1 (no blocking factor), 2:1, 4:1 and 8:1 HOL blocking factors, queue set storage 118 would need to physically accommodate only 48×36+24×36+12×36+6×36=3,240 virtual output queues, a 50% reduction in the number of virtual output queues required.

By allowing a user to customize the amount of HOL blocking allowed for the respective classes of service supported by a network switch, a user can tailor the use of physical resources provided by the network switch, e.g., the physical queue space, etc., to provide an optimal benefit to the operational environment in which the network switch will be used.

Figure 2:
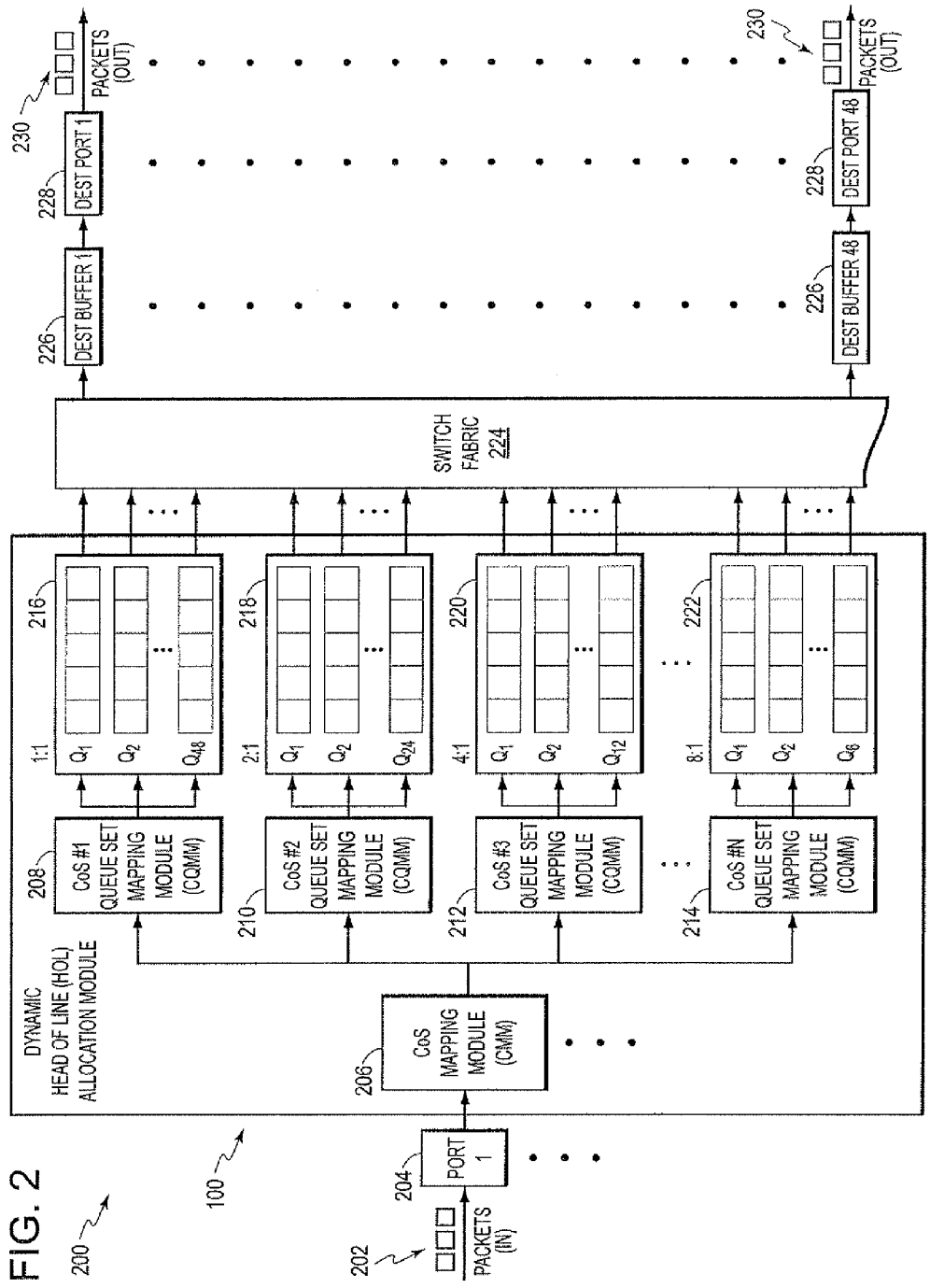
FIG. 2 is a schematic diagram that shows a portion of a network switch that uses the dynamic HOL allocation module of FIG. 1.
Figure 3:
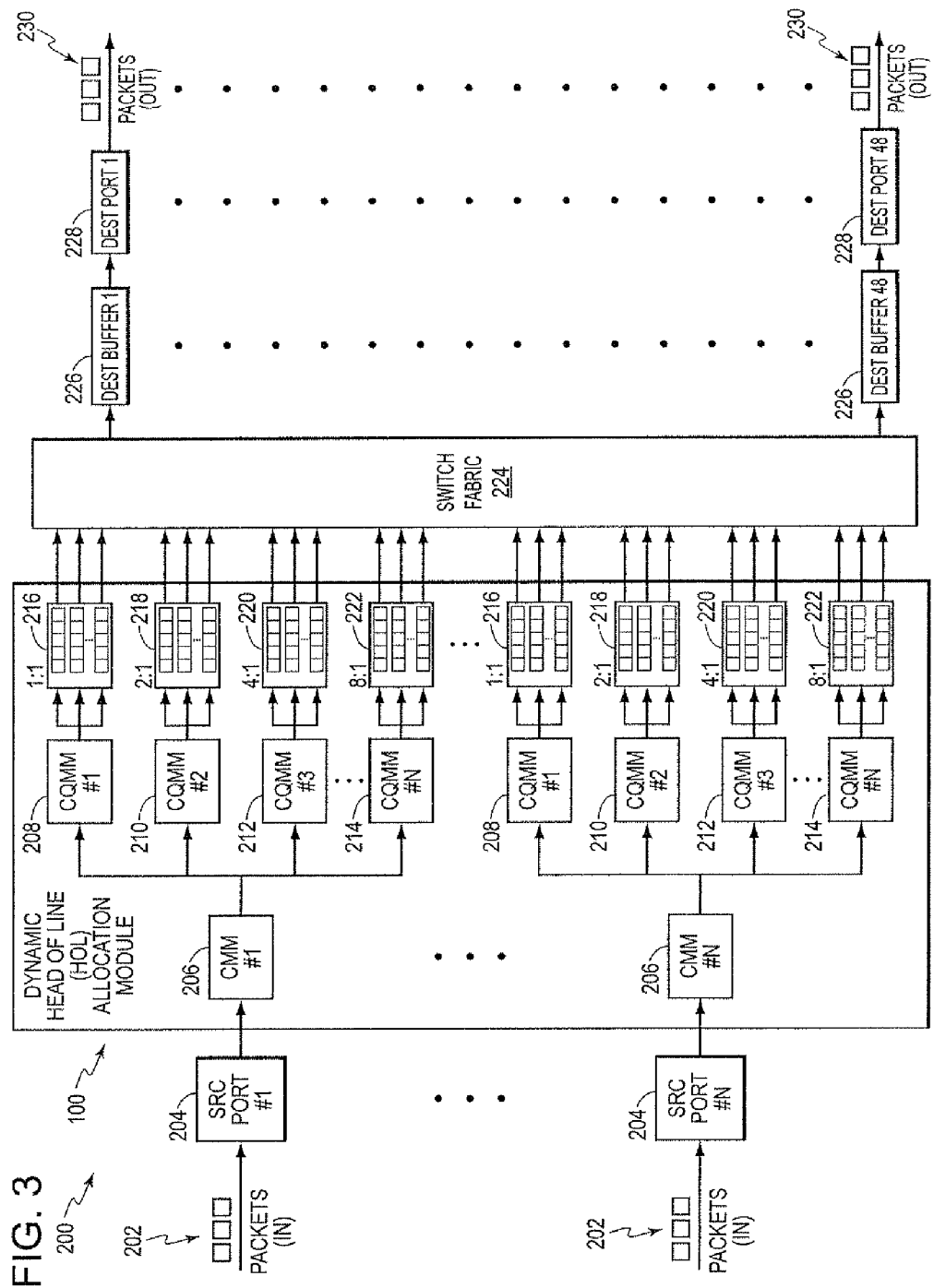
FIG. 3 is a schematic diagram that shows additional portions of the network switch of FIG. 2 that use the dynamic HOL allocation module of FIG. 1.

FIG. 2 is a schematic diagram that shows a portion of a network switch that uses the dynamic HOL allocation module of FIG. 1. FIG. 3 is a schematic diagram that shows additional portions of the network switch of FIG. 2 that are not shown in FIG. 2. As shown in FIG. 2 and FIG. 3, network switch 200 may provide a switching service between multiple network source ports 204 and multiple destination ports 228. Each source port 204 may be provided connectivity to each of the respective destination ports 228 by an embodiment of dynamic HOL allocation module 100 as described above with respect to FIG. 1, a switch fabric 224, and a destination port buffer 226. Dynamic HOL allocation module 100 may include for each source port 204, a CoS mapping module (CMM) 206, and a plurality of CoS queue set mapping modules (CQMMs) (shown in FIG. 2 and FIG. 3 at 208-214). Each CoS queue set mapping module (CQMM) may be configured with a queue set (shown in FIG. 2 at 216-222) based on either a linear virtual output queue to destination port mapping or a virtual output queue to destination port mapping based on a user selected HOL blocking factor.

For example, as shown in FIG. 2, CoS queue set mapping module (CQMM) 208 is configured with queue set 216 which has a 1:1 destination port to virtual output queue ratio, i.e., no HOL blocking. CoS queue set mapping module (CQMM) 210 is configured with queue set 218 which has a 2:1 destination port to virtual output queue ratio, i.e., an HOL blocking of 2.0. CoS queue set mapping module (CQMM) 212 is configured with queue set 220 which has a 4:1 destination port to virtual output queue ratio, i.e., an HOL blocking of 4.0. CoS queue set mapping module (CQMM) 214 is configured with queue set 222 which has a 8:1 destination port to virtual output queue ratio, i.e., an HOL blocking of 8.0. However, the number of classes of service and the HOL blocking factors assigned to each class of service shown in FIG. 2 and FIG. 3 are merely example embodiments. The number of CoS queue set mapping modules (CQMMs) associated with a source port CoS mapping module (CMM) depends on the number of classes of service that the source port is configured to support. The number of classes of services provided each source port and the blocking factor, if any, assigned to each source port class of service may be user configurable based on control parameters provided by the user via user interface module 104.

For purposes of explanation, switch 200 is assumed to be a network switch with 36 source ports and 48 output ports. For ease of illustration, however, FIG. 2 and FIG. 3 show components used to provide connectivity between only a small subset of those ports. Components associated with source ports and destination ports not shown are indicated with dotted lines indicating the components not shown may be identical to those components shown. Embodiments of a CoS mapping module (CMM), embodiments of CoS queue set mapping module (CQMM), and embodiments of queue sets allocated to the respective CoS queue set mapping modules shown in FIG. 2 and FIG. 3 correspond in function and operation to CoS mapping module (CMM) 114, CoS queue set mapping module (CQMM) 116, and queue sets assigned from queue set storage 118, as described above with respect to FIG. 1.

Each embodiment of CoS mapping module (CMM) 206, e.g., shown in FIG. 2 and FIG. 3 at 206, corresponds to an embodiment of CoS mapping module (CMM) 114, described above with respect FIG. 1, configured for each respective source port by CoS map generation module 110, e.g., based on default or user provided configuration parameters. For example, each CoS mapping module (CMM) 206 embodiment may be configured with a class of service mapping table, one or more CoS queue assignment schemes and related control parameters, e.g., address data for a dynamic HOL allocation controller 102 (not shown in FIG. 2 and FIG. 3), address data for CoS queue set mapping modules assigned to the CoS mapping module, etc., stored in CoS mapping table/data store 106.

Each embodiment of CoS queue set mapping module (CQMM), e.g., shown in FIG. 2 and FIG. 3 at 208-214, corresponds to an embodiment of CoS queue set mapping module (CQMM) 116, described above with respect FIG. 1, configured for its assigned CoS mapping module (CMM) by CoS queue set map generation module 112, e.g., based on default or user provided configuration parameters. For example, each CoS queue set mapping module (CQMM) embodiment may be configured with a set of queue assignments, one or more queue assignment schemes, and related control parameters, e.g., address data for each queue in the queue set assigned to the CoS queue set mapping module, etc., stored in queue set mapping tables/data store 108.

Each embodiment of a CoS queue set, e.g., shown in FIG. 2 and FIG. 3 at 216-222, corresponds to an embodiment of a set of queues assigned to a CoS queue set mapping module by CoS queue set map generation module 112, e.g., based on default or user provided configuration parameters. For example, each CoS queue set embodiment may include a set of queue assignments that includes a number of virtual output queue assignments that is consistent with the HOL blocking factor provided by a default or user supplied configuration parameter, one or more queue assignment schemes, and related control parameters, e.g., address data for each queue in the queue set assigned, etc., stored in queue set mapping tables/data store 108.

Switch fabric 224 may be any switching medium capable of retrieving a packet from a queue set queue and passing the packet to a destination port buffer consistent with the destination indicated in the packet header. For example, as shown in FIG. 2 and FIG. 3, switch fabric 224 may be any switch fabric that scans the respective queue set queues and forwards a detected packet to one of 48 destination port buffers 226 associated with each of 48 destination ports 228.

Figure 4:
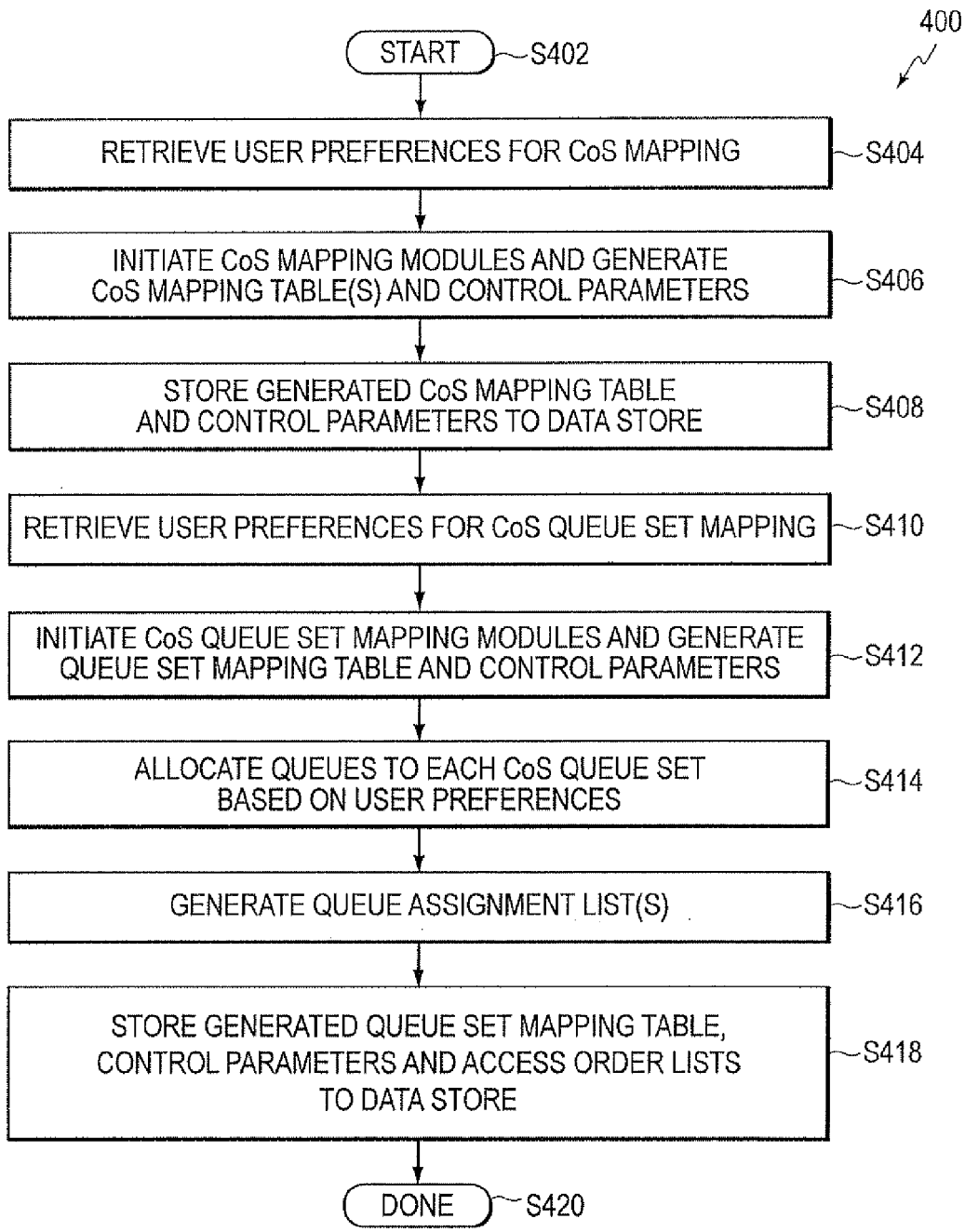
FIG. 4 is a flow-chart of an example process flow that may be performed by the dynamic HOL allocation module of FIG. 1 to configure the network switch virtual output queues based on user configured parameters.

FIG. 4 is a flow-chart of an example process flow that may be performed by the dynamic HOL allocation module 100 of FIG. 1, e.g., under the control of dynamic HOL allocation controller 102, CoS map generation module 110, and CoS queue set map generation module 112, as described above, to configure the network switch with classes of service and virtual output queues based on user configured, and/or default parameters. As shown in FIG. 4, operation of process 400 begins at step S402 and proceeds to step S404.

In step S404, CoS map generation module 110 may retrieve, e.g., from CoS mapping table/data store 106, user defined configuration preferences and/or default configuration preferences, that define classes of service to be associated with each network switch source port, and operation of the process continues to step S406.

In step S406, CoS map generation module 110 may initiate a CoS mapping module (CMM) 114 for each network switch source port and may generate a CoS mapping table for each CoS mapping module (CMM) 114, or may generate a CoS mapping table that is shared by the respective CoS mapping modules, based on class of service definitions provided by the retrieved user defined configuration preferences and/or default configuration preferences. Each CoS mapping module may use the information contained within its unique or shared CoS mapping table to assign incoming data packets to a CoS queue set mapping module (CQMM) 116 based on a class of service determined for the packet. Once the CoS mapping table(s) and related control parameters are generated, operation of the process continues to step S408.

In step S408, CoS map generation module 110 may store the CoS mapping table(s) and related control parameters to CoS mapping table/data store 106. The one or more CoS mapping tables stored in CoS mapping table/data store 106 may be used to provide a CoS mapping module assigned to a source port with assignment criteria for use in mapping a received packet to a CoS queue set mapping module (CQMM) associated with a source port. Such mapping may be based on one or more criteria such as one or more of a CoS field data content contained in a header of a received packet, a destination field content contained in a header of the received packet, a size of the received packet, a time of day that the packet was received, a traffic load on the network switch at the time the packet was received, an alarm condition at the time the packet was received and/or other considerations, such as the port on which the packet was received. Once the CoS mapping table(s) and related control parameters are stored, operation of the process continues to step S410.

With respect to step S408, described above, a user may choose to define classes of service that differ from classes of service identified within the header data of received packets. Therefore, the CoS mapping tables may combine one or more CoS header defined classes of service into a common user-defined CoS. Further, the CoS mapping tables may expand a CoS header defined class of service into multiple user-defined classes of service based on additional information, which may include, but is not limited to, the size of the received packet, the destination of the received packet, the time of day, traffic load, and/or network switch alarm conditions.

In step S410, CoS queue set map generation module 112 may retrieve, e.g., from queue set mapping tables/data store 108, user defined configuration preferences and/or default configuration preferences, that define HOL blocking factors and queue assignment criteria for each class of service associated with each of the source ports, and operation of the process continues to step S412.

In step S412, CoS queue set map generation module 112 may initiate a CoS queue set mapping module (CQMM) 116 for each class of service associated with each of the respective source ports, i.e., for each CoS mapping module (CMM) 114. Further, CoS queue set map generation module 112 may generate for each CoS queue set mapping module (CQMM) 116 a queue set mapping table, and may provide each CoS queue set mapping module (CQMM) 116 with other control parameters, such as an address, or unique identifier, for the CoS mapping module (CMM) 114 to which the respective CoS queue set mapping module (CQMM) 116 has been assigned, and operation of the process continues to step S414.

With respect to step S412, described above, CoS queue set map generation module 112, upon initiating a set of CoS queue set mapping modules (CQMMs) for a CoS mapping module (CMM), may provide the CoS mapping module (CMM) with the addresses, or unique identifiers, for the respective CoS queue set mapping modules (CQMMs) that have been assigned to the CoS mapping module (CMM). Such information may be stored in CoS mapping table/data store 106 for retrieval by the respective CoS mapping modules as needed.

In step S414, CoS queue set map generation module 112 may allocate to the queue set mapping table for each CoS queue set mapping module (CQMM) 116, a set of virtual output queues, or queue set, based on the HOL blocking factor assigned to the class of service with which the queue set is associated. Although the physical queue memory may reside in queue set storage 118, addresses for each of the queues assigned to a queue set may be assigned to the queue set mapping table associated with the queue set. During operation, CoS queue set mapping module (CQMM) 116 may use the queue address data in the queue set mapping table to send packets to the respective queues based on a selected queue set assignment algorithm, or queue set assignment list. Once a queue set is allocated for each CoS queue set mapping module (CQMM) 116, operation of the process continues to step S416.

With respect to step S414, described above, based on the HOL blocking factor designated for each class of service by user configured and/or default values retrieved from CoS mapping table/data store 106, queue sets associated with a source port may include a mix of linear and HOL blocking factor queues. For example, a queue set associated with a high priority class of service for a port may have a linear mapping of virtual output queues to destination ports and, therefore, may have no HOL blocking factor. Other queue sets, e.g., associated with lower priority classes of service may have a reduced ratio of virtual output queues to destination ports, and hence, may experience varying degrees of HOL blocking.

In step S416, CoS queue set map generation module 112 may generate, for each queue set mapping table, one or more of a sequential order queue assignment list, a round-robin order queue assignment list, and a random order queue assignment list that may be selected for use by CoS queue set mapping module (CQMM) 116, during operation, to assign packets to the queue set in one of a sequential order, a round-robin order, or a random order, respectively, and operation of the process continues to step S418.

In step S418, CoS queue set map generation module 112 may store the queue set mapping tables, sequential order queue assignment list, round-robin order queue assignment list, random order queue assignment list, and related control parameters to queue set mapping tables/data store 108, and operation of the process continues to step S420 and terminates.

Figure 5:
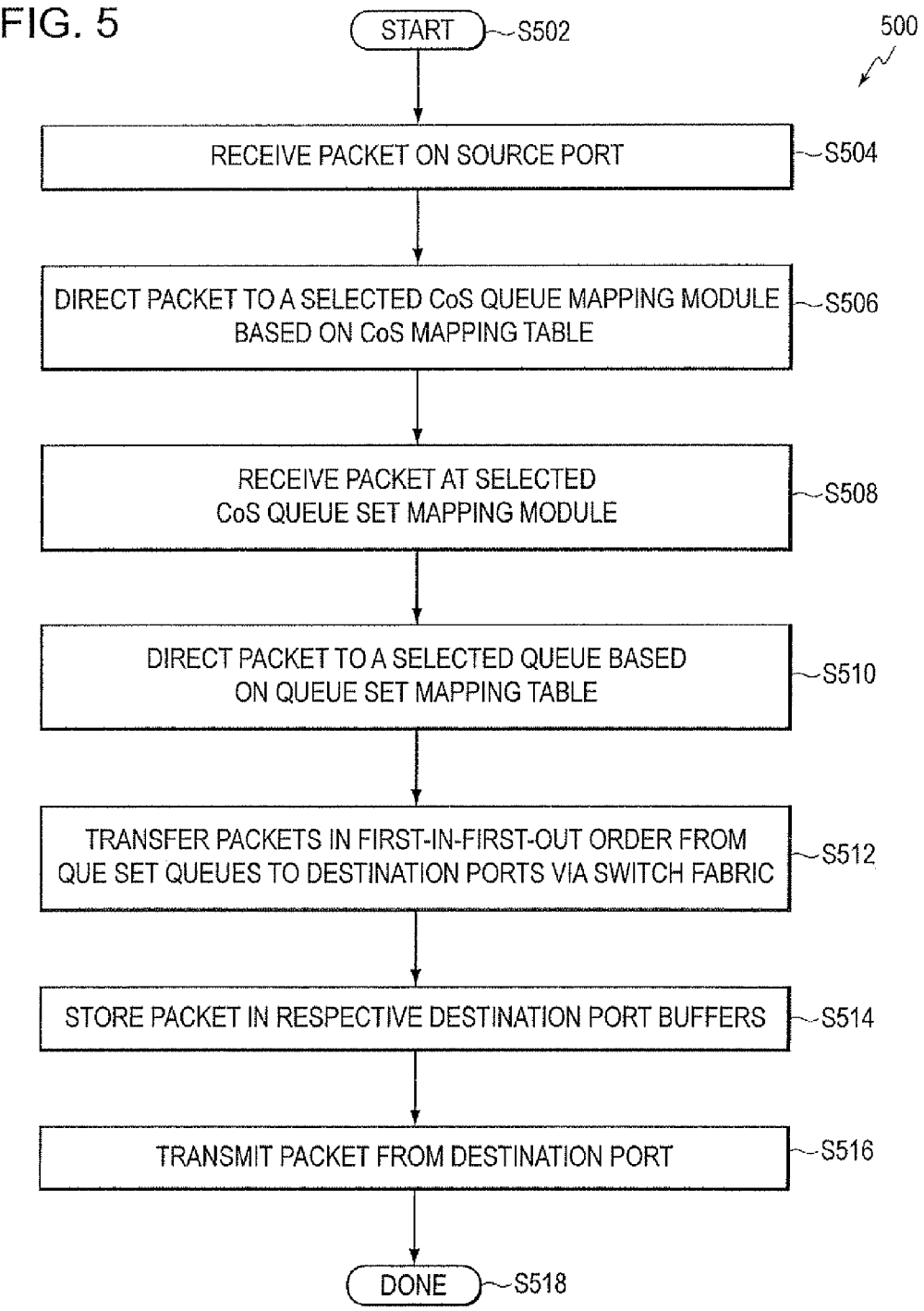
FIG. 5 is a flow-chart of an example process flow that may be performed by a network switch that uses the dynamic HOL allocation module of FIG. 1 to switch traffic received on a source port.

FIG. 5 is a flow-chart of an example process flow that may be performed by a network switch, e.g., such as network switch 200 described above with respect to FIG. 2 and FIG. 3, that uses the dynamic HOL allocation module of FIG. 1 to switch traffic received on a source port. As shown in FIG. 5, operation of process 500 begins at step S502 and proceeds to step S504.

In step S504, a CoS mapping module (CMM) 114 assigned to a network switch source port, e.g., source port 204 as shown in FIG. 2 and FIG. 3, may receive a packet, e.g., packet 202 as shown in FIG. 2 and FIG. 3, and operation of the process continues to step S506.

In step S506, CoS mapping module (CMM) 114 may direct the packet to a CoS queue set mapping module (CQMM) 116, e.g., as described in greater detail with respect to FIG. 6, below, and operation of the process continues to step S508.

In step S508, the packet may be received at a CoS queue set mapping module (CQMM) 116, and operation of the process continues to step S510.

In step S510, the CoS queue set mapping module (CQMM) may assign the packet to a queue within a set of virtual output queues, or queue set, assigned to the CoS queue set mapping module (CQMM), as described in greater detail with respect to FIG. 7, below, and operation of the process continues to step S512.

In step S512, packets may be pulled from the respective virtual output queues by a switch fabric, e.g., switch fabric 224 as shown in FIG. 2 and FIG. 3, in a first-in-first-out (FIFO) order and transferred across the switch fabric to a destination port buffer, e.g., destination port buffer 226 as shown in FIG. 2 and FIG. 3, and operation of the process continues to step S514.

In step S514, the destination port buffer may store the received packet, and operation of the process continues to step S516.

In step S516, the destination port may retrieve the packet from the destination port buffer and transmit the packet over a network media, e.g., network cable, radio transmission frequency, optical fiber, etc., and operation of the process continues to step S518 and the process terminates.

Figure 6:
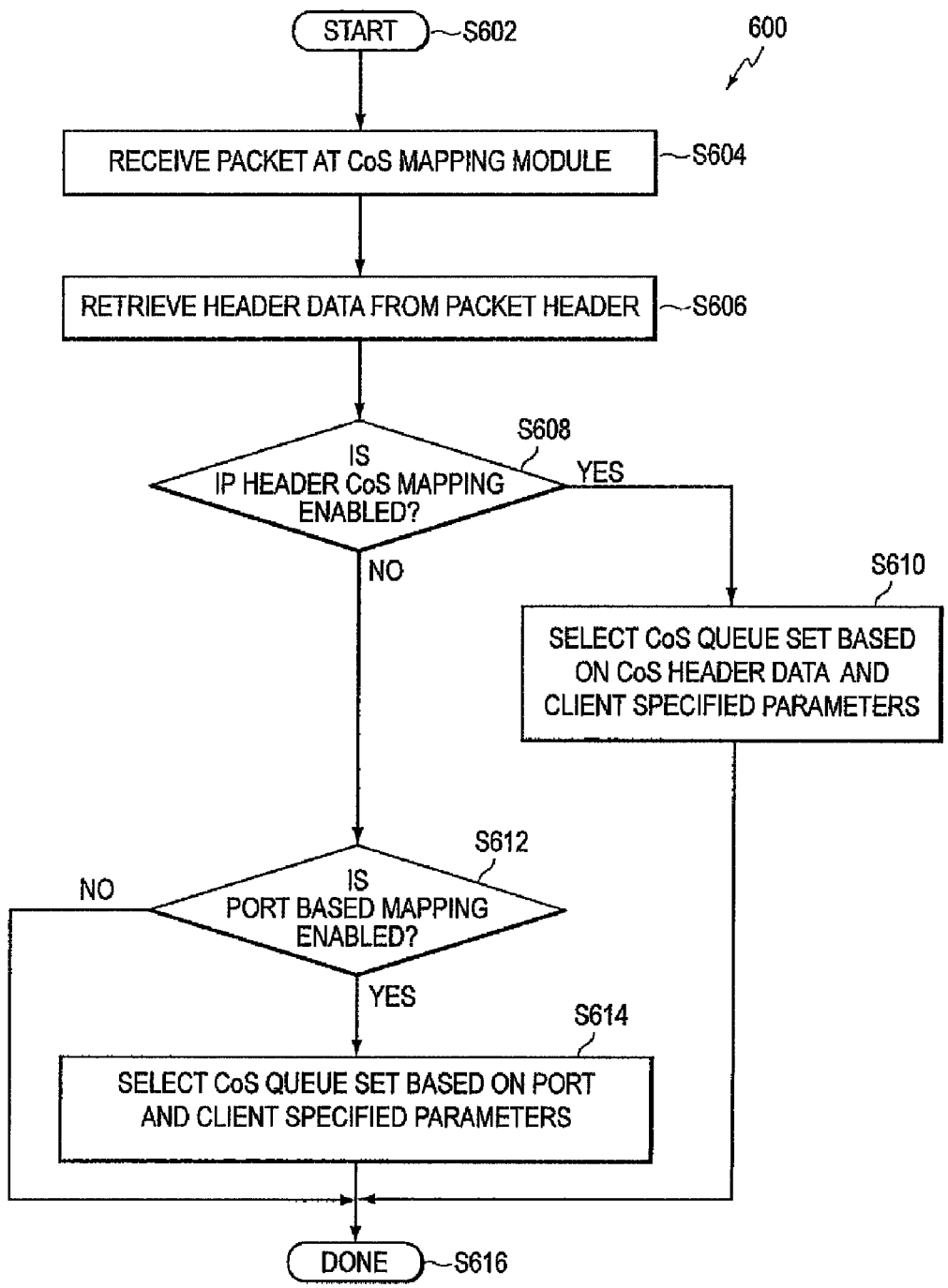
FIG. 6 is a flow-chart of an example process flow that may be performed by an example CoS mapping module within the dynamic HOL allocation module of FIG. 1 to switch traffic received on a source port.

FIG. 6 is a flow-chart of an example process flow that may be performed by an example CoS mapping module (CMM) 114 within the dynamic HOL allocation module of FIG. 1 to switch traffic received on a source port. As shown in FIG. 6, operation of process 600 begins at step S602 and proceeds to step S604.

In step S604, a CoS mapping module (CMM) 114 assigned to a network switch source port, e.g., source port 204 as shown in FIG. 2 and FIG. 3, may receive a packet, e.g., packet 202 as shown in FIG. 2 and FIG. 3, operation of the process continues to step S606.

In step S606, CoS mapping module (CMM) 114 may parse header data included in the packet to retrieve packet header data containing, for example, a destination of the packet, a size of the packet, a class of service assigned to the packet by an originating device, etc., and operation of the process continues to step S608.

If, in step S608, CoS mapping module (CMM) 114 determines, e.g., based on control parameters retrieved from CoS mapping table/data store 106, that the packet is to be assigned to a class of service queue, e.g., to a CoS queue set mapping module (CQMM) 116, based, at least in part, on the class of service data contained in the header of the packet, operation of the process continues to step S610; otherwise, operation of the process continues to step S612.

In step S610, CoS mapping module (CMM) 114 may assign the packet to a class of service queue, e.g., to a CoS queue set mapping module (CQMM) 116, based on class of service data contained in the header of the packet and any additional parameters specified in the client configured or default parameters stored in CoS mapping table/data store 106, and operation of the process continues to step S616 and the process terminates.

With respect to step S610, above, a packet may be assigned to a CoS queue set mapping module (CQMM) 116, based solely on the class of service data included in the packet header, or based on the class of service data included in the packet header and other data available to CoS mapping module (CMM) 114. For example, a user may choose to define classes of service that differ from classes of service identified within the header data of received packets by using the CoS mapping tables to combine one or more CoS packet header defined classes of service in to a common user-define CoS. Further, the CoS mapping tables may be configured to expand a CoS header defined classes of service into multiple user-define classes service based on additional information, such as the size of the received packet, the destination of the received packet, the time of day, traffic load, and or network switch alarm conditions. In this manner, packets having a header data that identifies the packet as having one of a set of predetermined classes of service may be treated as either a higher, or a lower, class of service based on changing conditions in the operational environment.

If, in step S612, CoS mapping module (CMM) 114 determines, e.g., based on control parameters retrieved from CoS mapping table/data store 106, that the packet is to be assigned to a class of service queue, e.g., to a CoS queue set mapping module (CQMM) 116, based, at least in part, on the source port on which the packet was received, operation of the process continues to step S614; otherwise, operation of the process continues to step S616 and the process terminates.

In step S614, CoS mapping module (CMM) 114 may assign the packet to a class of service queue, e.g., to a CoS queue set mapping module (CQMM) 116, based on the source port on which the packet was received and any additional parameters specified in the client configured or default parameters stored in CoS mapping table/data store 106, and operation of the process continues to step S616 and the process terminates.

With respect to step S614, above, a packet may be assigned to a CoS queue set mapping module (CQMM) 116, based on the port on which the packet was received as well as additional information, such as the size of the received packet, the destination of the received packet, the time of day, traffic load, and or network switch alarm conditions. In this manner, select types of traffic received on a port may be treated as either a higher, or a lower, class of service based on changing conditions in the operational environment.

Figure 7:
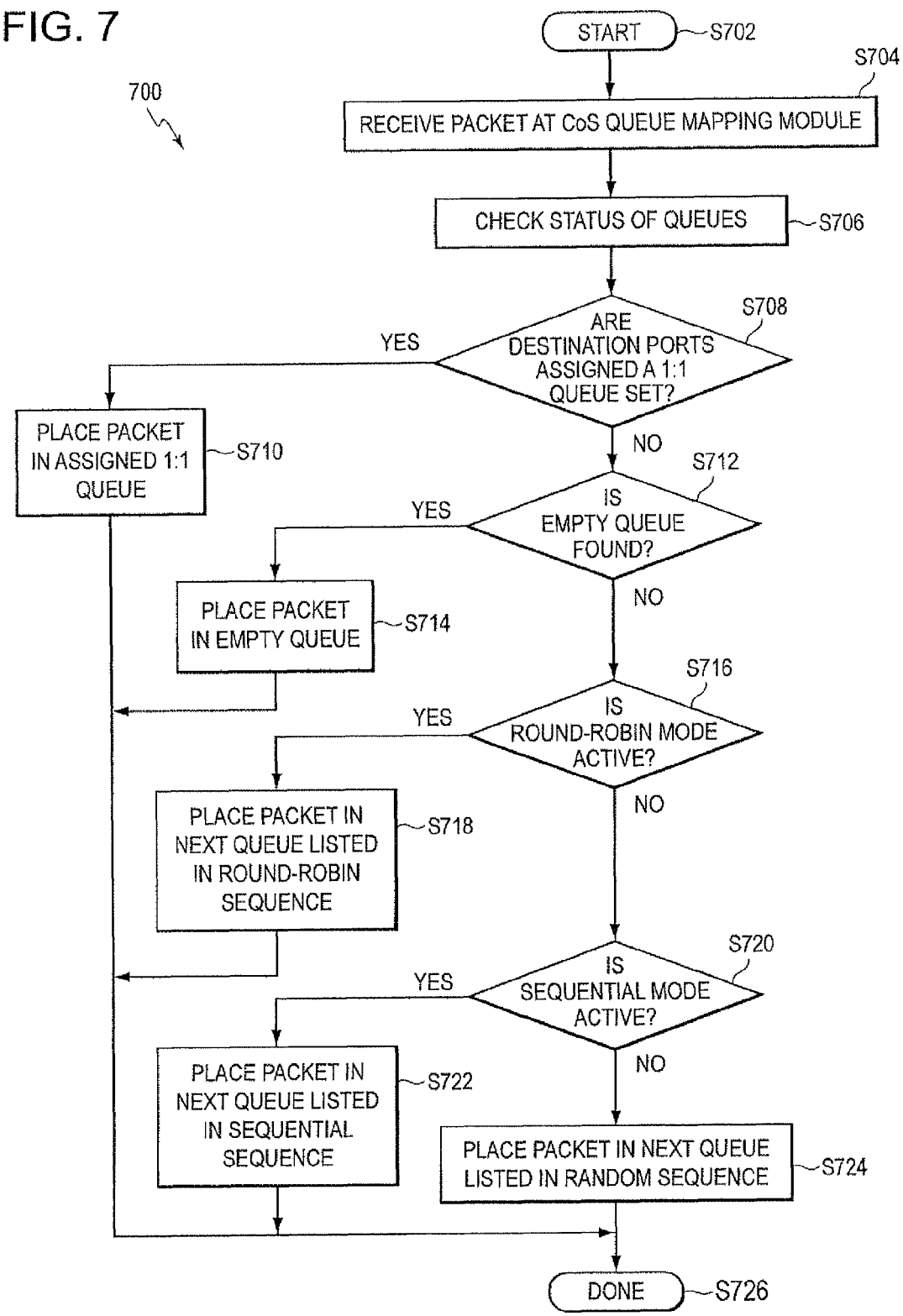
FIG. 7 is a flow-chart of an example process flow that may be performed by each of multiple CoS queue set mapping modules within the dynamic HOL allocation module of FIG. 1 to switch traffic received from a CoS mapping module.

FIG. 7 is a flow-chart of an example process flow that may be performed by a CoS queue set mapping module (CQMM) 116 on receipt of a packet from a CoS mapping module (CMM) 114. The example process described below may be used to assign the received packet to one of several virtual output queues included with the queue set assigned to the CoS queue set mapping module (CQMM) 116. As shown in FIG. 7, operation of process 700 begins at step S702 and proceeds to step S704.

In step S704, a CoS queue set mapping module (CQMM) 116 assigned to a CoS mapping module (CMM) 114, e.g., CoS queue set mapping module (CQMM) 208 assigned to CoS mapping module (CMM) 206 as shown in FIG. 2 and FIG. 3, may receive a packet, e.g., packet 202 as shown in FIG. 2 and FIG. 3, and operation of the process continues to step S706.

In step S706, CoS queue set mapping module (CQMM) 116 may check the status of the queues in the queue set that it manages, and operation of the process continues to step S708.

If, in step S708, CoS queue set mapping module (CQMM) 116 determines that the queue set that it has been assigned includes a 1:1 ratio of virtual queues to destination ports, operation of the process continues to step S710; otherwise, operation of the process continues to step S710.

In step S710, CoS queue set mapping module (CQMM) 116 may assign the packet to a queue within the queue set associated with the destination port to which the packet is to be sent, and operation of the process continues to step S722 and operation of the process terminates.

If, in step S712, CoS queue set mapping module (CQMM) 116 determines that the queue set includes an empty queue, operation of the process continues to step S714; otherwise, operation of the process continues to step S716.

In step S714, CoS queue set mapping module (CQMM) 116 may assign the packet to the identified empty queue, and operation of the process continues to step S722 and operation of the process terminates.

If, in step S716, CoS queue set mapping module (CQMM) 116 determines that it is configured to assign the packet to a next queue in a predetermined round-robin sequence, or list, operation of the process continues to step S718; otherwise, operation of the process continues to step S720.

In step S718, CoS queue set mapping module (CQMM) 116 may assign the packet to a next queue identified in a predetermine round-robin sequence, or list, and operation of the process continues to step S726 and operation of the process terminates.

If, in step S720, CoS queue set mapping module (CQMM) 116 determines that it is configured to assign the packet to a next queue in a predetermined sequential sequence, or list, operation of the process continues to step S722; otherwise, operation of the process continues to step S724.

In step S722, CoS queue set mapping module (CQMM) 116 may assign the packet to a next queue identified in a predetermine sequential sequence, or list, and operation of the process continues to step S726 and operation of the process terminates.

In step S724, CoS queue set mapping module (CQMM) 116 may assign the packet to a next queue identified in a predetermine random sequence, or list, and operation of the process continues to step S726 and operation of the process terminates.

For purposes of explanation in the above description, numerous specific details are set forth in order to provide a thorough understanding of the described dynamic HOL allocation module that supports, dynamically configurable classes of service, dynamically configurable virtual output queues, or queue sets, that support dynamically configurable HOL blocking factors, and dynamically configurable queue assignment schemes, based on default or user configured parameters. It will be apparent, however, to one skilled in the art that the described dynamic HOL allocation module may be practiced without these specific details. In other instances, well-known structures and devices are shown in block diagram form in order to avoid obscuring the features of the described dynamic HOL allocation module.

While the dynamic HOL allocation module that supports, dynamically configurable classes of service, dynamically configurable virtual output queues that support dynamically configurable HOL blocking factors, and dynamically configurable queue assignment schemes, based on default or user configured parameters has been described in conjunction with the specific embodiments thereof, it is evident that many alternatives, modifications, and variations will be apparent to those skilled in the art. Accordingly, embodiments of the dynamic HOL allocation module, as set forth herein, are intended to be illustrative, not limiting. There are changes that may be made without departing from the spirit and scope of the invention.

What is claimed is:

1. A head of line (HOL) allocation module, comprising:
   a class of service (CoS) mapping module configured to receive packets from a corresponding network switch source port and to assign one of a plurality of classes of service to each received packet;
   a plurality of queue set mapping modules configured to receive packets from the CoS mapping module, each queue set mapping module having an associated CoS and configured to receive packets assigned to the CoS associated with that queue set mapping module; and
   a plurality of queue sets, each queue set having a plurality of assigned queues, each queue set configured to receive packets from a corresponding one of the plurality of queue set mapping modules and to distribute the received packets amongst the assigned queues, wherein the packets received by each queue set have the same CoS and each of the plurality of queue sets is associated with a HOL blocking factor that is a ratio of destination ports to virtual queues provided for the CoS supported by the corresponding network switch source port, and wherein the HOL blocking factor associated with a first queue set is different from the HOL blocking factor associated with a second queue set.

2. The head of line allocation module of claim 1, further comprising:
   a user interface module that allows a user to provide CoS definitions used to assign a received packet to a CoS and that allows the user to provide an HOL blocking factor for each defined CoS.

3. The head of line allocation module of claim 1, further comprising:
   a CoS mapping table data store that stores CoS definitions used to assign a received packet to a CoS.

4. The head of line allocation module of claim 1, wherein the CoS mapping module selects CoS definitions used to assign a CoS to a received packet based on at least one of a day/time, a current network switch traffic load, and a current network switch alarm event.

5. The head of line allocation module of claim 1, further comprising:
a queue set map generation module that initiates the plurality of queue set mapping modules based on a number of CoS definitions stored in a CoS mapping table.

6. The head of line allocation module of claim 1, further comprising:
a queue set mapping table data store that stores HOL blocking factors assigned to each defined CoS.

7. The head of line allocation module of claim 6, further comprising:
a queue set map generation module that determines a number of assigned queues for each queue set based on the HOL blocking factor assigned to a CoS.

8. The head of line allocation module of claim 1, wherein each of the plurality of queue set mapping modules is configured to assign packets to a corresponding queue set based on one of a plurality of assignment schemes.

9. The head of line allocation module of claim 8, wherein the assignment scheme to be used for the corresponding queue set is selected based on a monitored condition of the queue set.

10. The head of line allocation module of claim 8, wherein the plurality of assignment schemes include assigning a packet to a determined empty queue in a queue set, assigning a packet to a queue in a queue set based on a sequential order, assigning a packet to a queue in a queue set based on a round-robin order, and assigning a packet to a queue in a queue set based on a random order.

11. A method of configuring a class of service (CoS) head of line (HOL) allocation module for use in a network switch, comprising:
configuring a CoS mapping module to receive packets from a corresponding network switch source port and to assign one of a plurality of classes of service to each received packet;
configuring a plurality of queue set mapping modules to receive packets from the CoS mapping module, each queue set mapping module having an associated CoS and configured to receive packets assigned to the CoS associated with that queue set mapping module: and
configuring each queue set of a plurality of queue sets, each queue set having a plurality of assigned queues, to receive packets from a corresponding one of the plurality of queue set mapping modules and to distribute the received packets amongst the assigned queues,
wherein the packets received by each queue set have the same CoS and each of the plurality of queue sets is associated with a HOL blocking factor that is a ratio of destination ports to virtual queues provided for the CoS supported by the corresponding network switch source port, and
wherein the HOL blocking factor associated with a fist queue set is different from the HOL blocking factor associated with a second queue set.

12. The method of claim 11, further comprising:
receiving user defined CoS definitions that are used to assign a received packet to a CoS; and
receiving a user defined HOL blocking factor for each defined CoS.

13. The method of claim 11, further comprising:
storing CoS definitions used to assign a received packet to a CoS in a CoS mapping table data store.

14. The method of claim 11, further comprising:
selecting CoS definitions used to assign a CoS to a received packet based on at least one of a day/time, a current network switch traffic load, and a current network switch alarm event.

15. The method of claim 11, further comprising:
initiating the plurality of queue mapping modules for each network switch source port based on a number CoS definitions stored in a CoS mapping table.

16. The method of claim 11, further comprising:
storing HOL blocking factors assigned to each defined CoS.

17. The method of claim 16, further comprising:
assigning a number of queues to a queue set based on an HOL blocking factor assigned to a COS.

18. The method of claim 11, further comprising:
assigning packets to one of the assigned queues in a queue set based on one of a plurality of assignment schemes.

19. The method of claim 18, wherein the plurality of assignment schemes includes assigning a packet to a determined empty queue in a queue set, assigning a packet to a queue in a queue set based on a sequential order, assigning a packet to a queue in a queue set based on a round-robin order, and assigning a packet to a queue in a queue set based on a random order.

20. The head of line allocation module of claim 1 included in a network switch, the network switch further comprising:
a switch fabric that removes packets from the plurality of queue sets and delivers the packets to a plurality of destination port buffers; and
a plurality of destination ports, each destination port associated with a respective destination port buffer and configured to transmit packets retrieved from the respective destination port buffer over a transmission media.

* * * * *